US007924907B2

(12) United States Patent
Cho et al.

(10) Patent No.: US 7,924,907 B2
(45) Date of Patent: Apr. 12, 2011

(54) APPARATUS AND METHOD FOR SPREADING/DE-SPREADING DATA USING PAIR OF CHILD ORTHOGONAL VARIABLE SPREADING FACTOR CODES

(75) Inventors: Sung-Rae Cho, Daejon (KR); Seong-Su Park, Daejon (KR); Hoo-Sung Lee, Daejon (KR); Byung-Jo Kim, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 842 days.

(21) Appl. No.: 11/839,975

(22) Filed: Aug. 16, 2007

(65) Prior Publication Data
US 2008/0130716 A1 Jun. 5, 2008

(30) Foreign Application Priority Data
Dec. 1, 2006 (KR) .................. 10-2006-0120831

(51) Int. Cl.
*H04B 1/69* (2006.01)
(52) U.S. Cl. ........ 375/146; 375/130; 375/135; 375/141; 375/295; 375/296; 375/299; 375/306; 375/307; 375/309; 375/310; 455/69
(58) Field of Classification Search .................. 375/130, 375/135, 146, 295–296, 299, 306–307, 309–310, 375/141; 455/69
See application file for complete search history.

(56) References Cited

U.S. PATENT DOCUMENTS

| 6,198,734 B1 * | 3/2001 | Edwards et al. ............... 370/347 |
| 6,233,231 B1 * | 5/2001 | Felix et al. ..................... 370/335 |
| 7,167,502 B1 * | 1/2007 | Tsaur ............................ 375/130 |
| 7,280,581 B2 * | 10/2007 | Khan ............................ 375/141 |
| 7,372,912 B2 * | 5/2008 | Seo et al. ....................... 375/267 |
| 7,542,514 B2 * | 6/2009 | Song et al. .................... 375/260 |
| 2005/0099992 A1 * | 5/2005 | Sato ............................. 370/350 |

FOREIGN PATENT DOCUMENTS
KR 2001-0082745 A 8/2001
KR 2005-0095902 A 10/2005

* cited by examiner

*Primary Examiner* — Mohammad H Ghayour
*Assistant Examiner* — Sophia Vlahos
(74) *Attorney, Agent, or Firm* — Ladas & Parry LLP (57) ABSTRACT there is provided a spreading apparatus using a child orthogonal variable spreading factor (OVSF) code pair, including: a channel condition information receiving unit for receiving channel condition information including a channel condition metric; a switch controlling unit for receiving the channel condition information from the channel condition information receiving unit and transferring data stream according to the received channel station information; a first spreading unit for receiving the data stream from the switching controlling unit, and spreading the data stream using a single OVSF code; and a second spreading unit for receiving the data stream from the switching controlling unit, and spreading the data stream using a child OVSF code pair.

4 Claims, 10 Drawing Sheets

APPARATUS AND METHOD FOR SPREADING/DE-SPREADING DATA USING PAIR OF CHILD ORTHOGONAL VARIABLE SPREADING FACTOR CODES

CROSS-REFERENCE(S) TO RELATED APPLICATIONS

The present invention claims priority of Korean Patent Application No. 10-2006-0120831, filed on Dec. 1, 2006, which is incorporated herein by reference.

BACKGROUND OF THE INVENTION

1. Field of the Invention

The present invention relates to an apparatus and method for spreading and de-spreading data using a pair of child orthogonal variable spreading factor (OVSF) codes; and, more particularly, to an apparatus and method for spreading and de-spreading data selectively using a single orthogonal variable spreading factor (OVSF) code or a pair of child OVSF codes according to a channel condition in CDMA or WCDMA communication scheme including a RAKE structure that uses multi-path diversity to improve a signal to noise ratio in order to reduce inter-symbol interference (ISI) induced by mobility.

2. Description of Related Art

When a mobile station having mobile communication equipment communicates with a base station, the mobile station performs a fast power control operation in a slot unit or uses multipath diversity to improve a signal to noise ration (SNR), thereby improving the processing capacity of an overall system.

Since the channel state dynamically varies due to the mobility of the mobile station, the channel estimation error and inter-symbol interference (ISI) are induced. Although the power control operation is performed in a slot unit, it cannot correct the channel estimation error and ISI.

Hereinafter, a conventional apparatus for spreading and de-spreading data using a single code will be described with reference to FIGS. 1 and 2.

Figure 1:
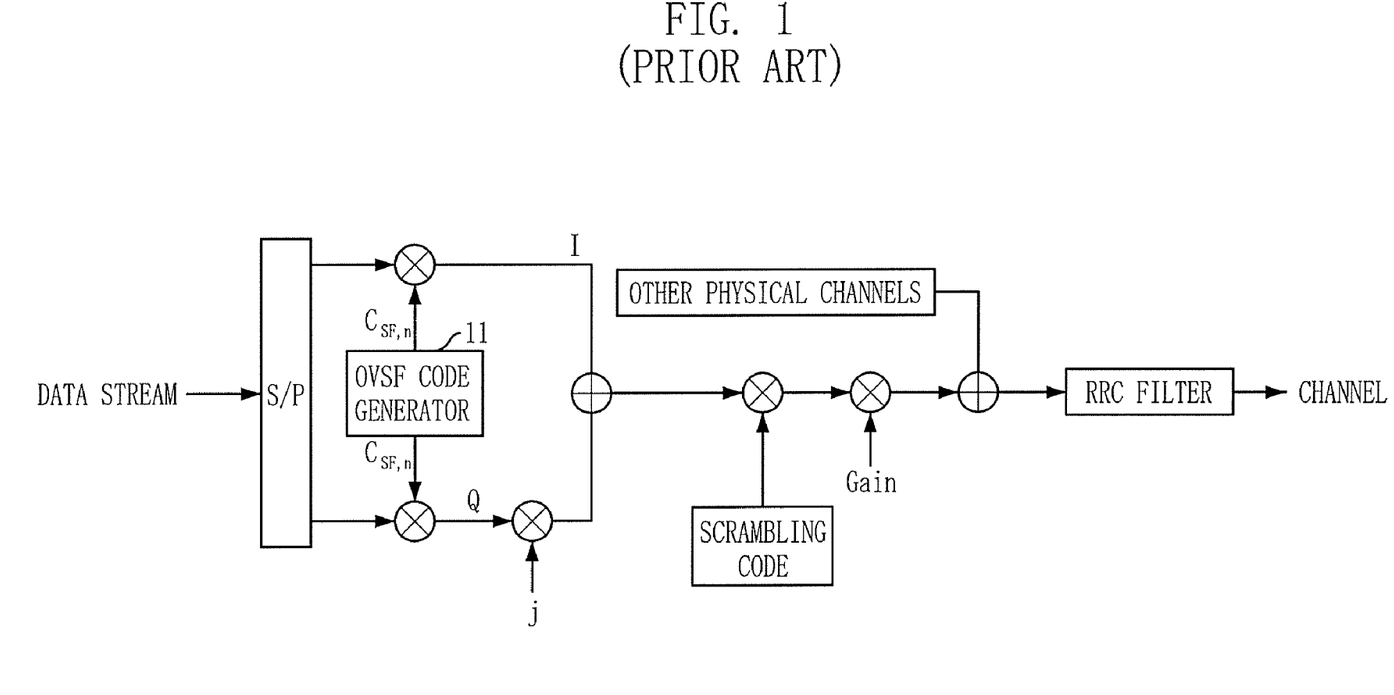
FIG. 1 is a block diagram illustrating a conventional spreading apparatus.
Figure 2:
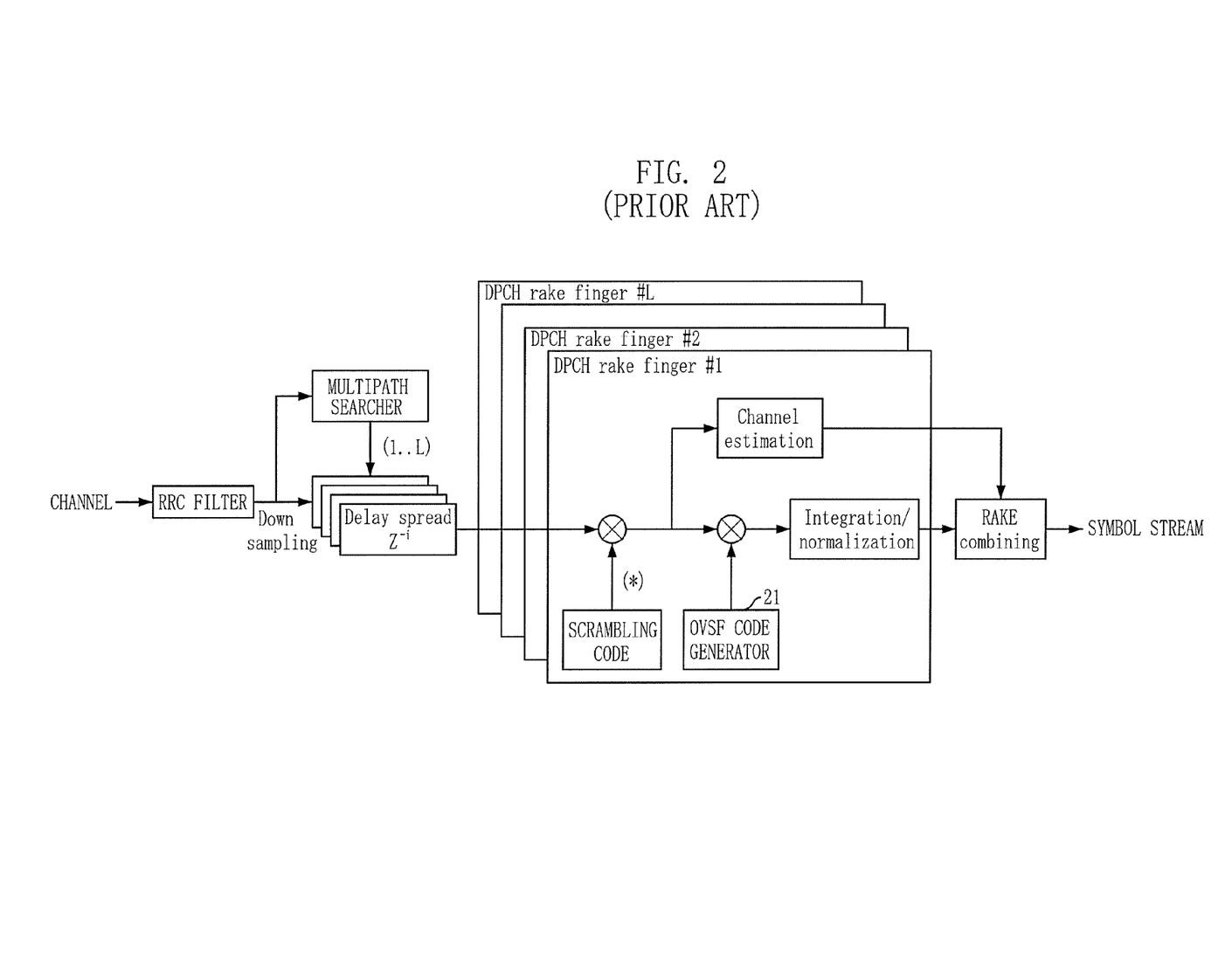
FIG. 2 is a block diagram illustrating a conventional de-spreading apparatus.

FIG. 1 is a block diagram illustrating a conventional spreading apparatus, and FIG. 2 is a block diagram illustrating a conventional de-spreading apparatus.

As shown in FIG. 1, the conventional spreading apparatus spread data using an orthogonal variable spreading factor (OVSF) single code allocated from a network.

For example, when the conventional spreading apparatus spreads four data bits of $\{b_0, b_1, b_2, b_3\}$ from I-channel, the conventional spreading apparatus generates an OVSF cod $C_{2^{n+1},0}$ using the allocated spreading factor (SF) index, and sequentially spreads the four data bits like as $C_{2^{n+1},0}*b_0$, $C_{2^{n+1},0}*b_1$, $C_{2^{n+1},0}*b_2$, and $C_{2^{n+1},0}*b_3$.

Then, the conventional de-spreading apparatus using a single code, as shown in FIG. 2, generates an OVSF code $C_{2^{n+1},0}$ using a SF index allocated identically to that of the conventional spreading apparatus and extracts original four data bits from the de-spread signal.

The conventional spreading and de-spreading apparatus using the single code can significantly remove the channel estimation error and the ISI, which are induced by channel state that dynamically varies due to the mobility of the mobile station. The conventional spreading and de-spreading apparatus, however, requires a large amount of complex computation.

SUMMARY OF THE INVENTION

An embodiment of the present invention is directed to providing an apparatus and method for spreading and de-spreading data selectively using a single orthogonal variable spreading factor (OVSF) code or a pair of child OVSF codes according to a channel condition in CDMA or WCDMA communication scheme including a RAKE structure that uses multi-path diversity to improve a signal to noise ratio in order to reduce inter-symbol interference (ISI) induced by mobility.

In accordance with an aspect of the present invention, there is provided a spreading apparatus using a child orthogonal variable spreading factor (OVSF) code pair, including: a channel condition information receiving unit for receiving channel condition information including a channel condition metric; a switch controlling unit for receiving the channel condition information from the channel condition information receiving unit and transferring data stream according to the received channel station information; a first spreading unit for receiving the data stream from the switching controlling unit, and spreading the data stream using a single OVSF code; and a second spreading unit for receiving the data stream from the switching controlling unit, and spreading the data stream using a child OVSF code pair.

In accordance with another aspect of the present invention, there is provided a de-spreading apparatus using a child orthogonal variable spreading factor (OVSF) code pair, including: a channel condition information providing unit for measuring a channel condition metric and providing the measured channel condition metric; a switch controlling unit for transferring data stream according to channel condition information received from the channel condition information providing unit; a first de-spreading unit for de-spreading data stream received from the switch controlling unit using a single OVSF code; and a second de-spreading unit for de-spreading data stream received from the switch controlling unit to a child OVSF code pair using the single OVSF code from the first de-spreading unit.

In accordance with another aspect of the present invention, there is provided a spreading method using a child orthogonal variable spreading factor (OVSF) code pair, including: receiving channel condition information including channel condition metric from a de-spreading apparatus; analyzing the received channel condition information including the channel condition metric; spreading data stream using a signal OVSF code if the channel condition metric is larger than a threshold as the analyzing result; and spreading data stream after generating a child OVSF code pair if the channel condition metric is smaller than a threshold as the analyzing result.

In accordance with another aspect of the present invention, there is provided a de-spreading method using a child orthogonal variable spreading factor (OVSF) code pair including: measuring a channel condition metric and providing the measured channel condition metric to a spreading apparatus; determining whether the measured channel condition metric is larger than a predetermined threshold or not; de-spreading data using a signal OVSF code if the measured channel condition metric is larger than the predetermined threshold as the determining result; and de-spreading data using a child OVSF code pair if the measured channel condition metric is smaller than the threshold as the determining result.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

DESCRIPTION OF SPECIFIC EMBODIMENTS

The advantages, features and aspects of the invention will become apparent from the following description of the embodiments with reference to the accompanying drawings, which is set forth hereinafter.

Figure 3:
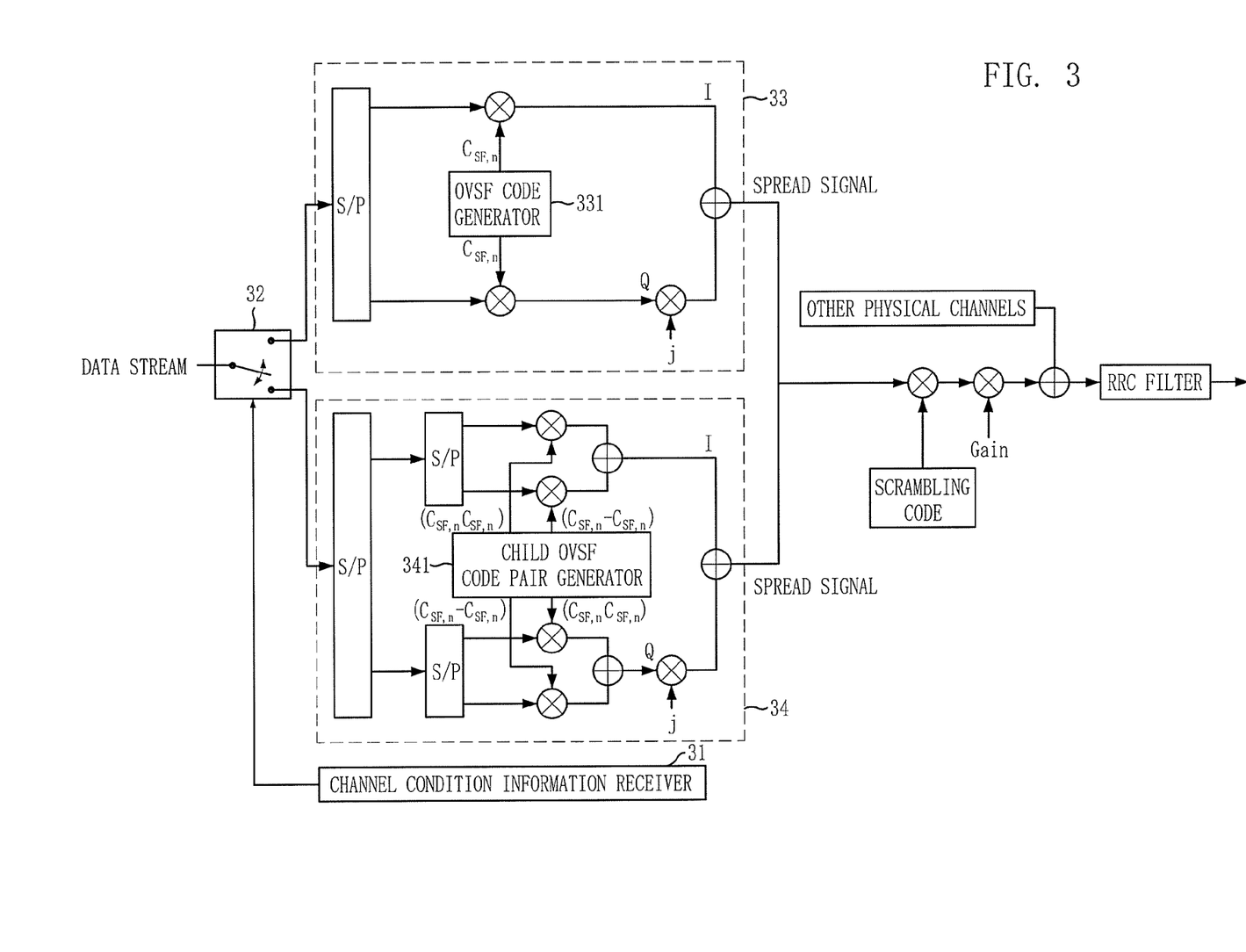
FIG. 3 is a block diagram illustrating a spreading apparatus using a pair of child OVSF codes in accordance with an embodiment of the present invention.

FIG. 3 is a block diagram illustrating a spreading apparatus using a pair of child OVSF codes in accordance with an embodiment of the present invention.

As shown in FIG. 3, the spreading apparatus using a child OVSF code pair according to the present embodiment includes a channel condition information receiver 31 for receiving channel condition information from a de-spreading apparatus, a switch controller 32 for transferring data stream to a first spreader 33 or a second spreader 34 according to the channel condition information received from the channel condition information receiver 31, a first spreader 33 for spreading data stream received from the switch controller 32 using a single OVSF code, and a second spreader 34 for spreading data stream received from the switch controller 32 using a child OVSF code pair.

The first spreader 33 includes an OVSF code generator 331 for generating a single OVSF code using a SF index allocated from a network.

The second spreader 34 includes a child OVSF code pair generator 341.

Hereinafter, the child OVSF code pair generator 341 will be described with reference to FIGS. 5 to 7.

Figure 5:
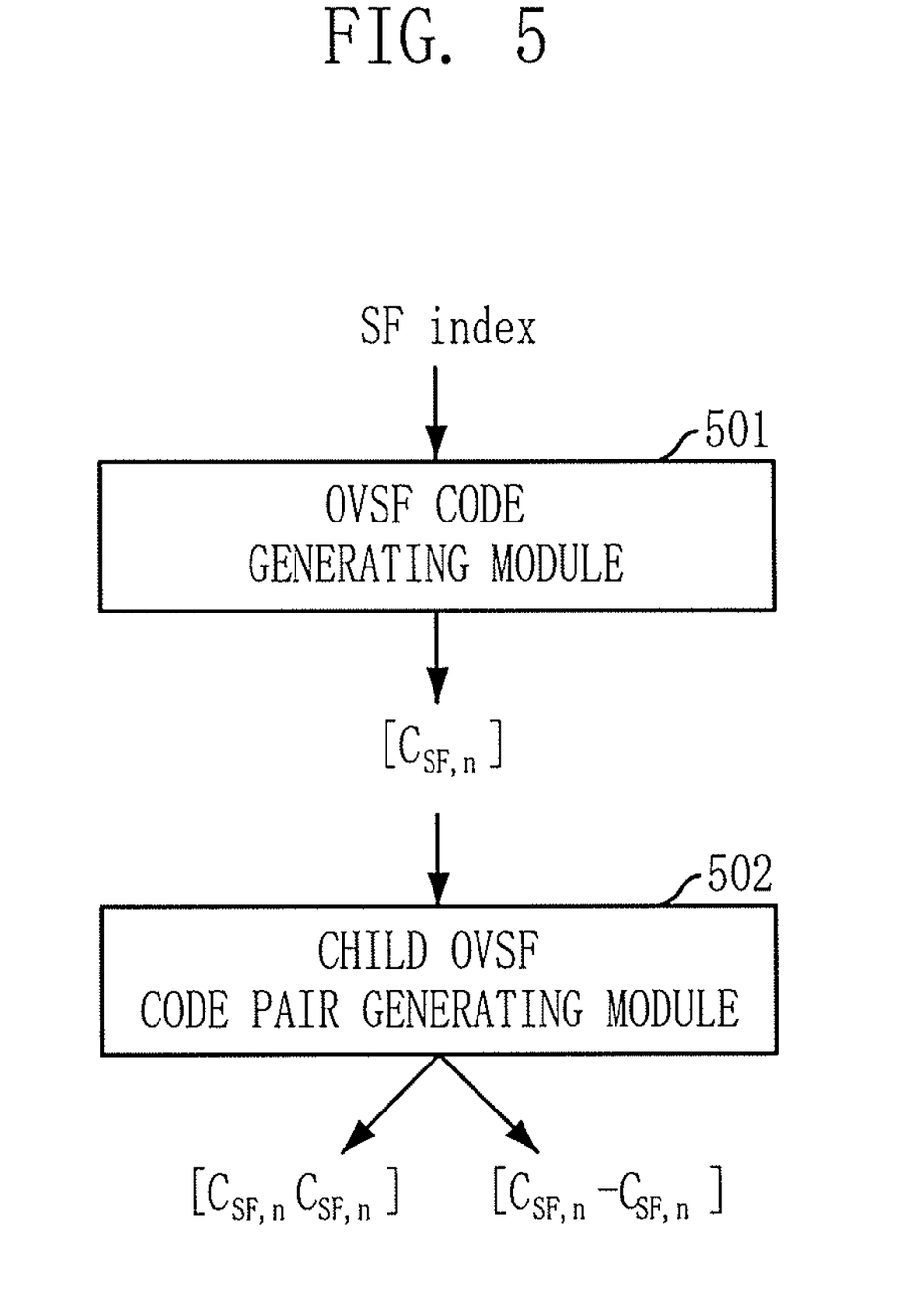
FIG. 5 is a diagram illustrating a child OVSF code pair generator in accordance with an embodiment of the present invention.

FIG. 5 shows the child OVSF code pair generator in accordance with an embodiment of the present invention.

As shown in FIG. 5, the child OVSF code pair generator 341 includes an OVSF code generating module 501 for generating signal OVSF code ($C_{SF,n}$) using a SF index allocated from a network, and a child OVSF code pair generating module 502 for generating a child OVSF code pair, that is, [$C_{SF,n}$ $C_{SF,n}$] [$C_{SF,n}$–$C_{SF,n}$], using the single OVSF code ($C_{SF,n}$) generated from the OVSF code generating module 501.

The OVSF code generating module 501 has the same structure and function of the OVSF code generator 331.

Figure 6:
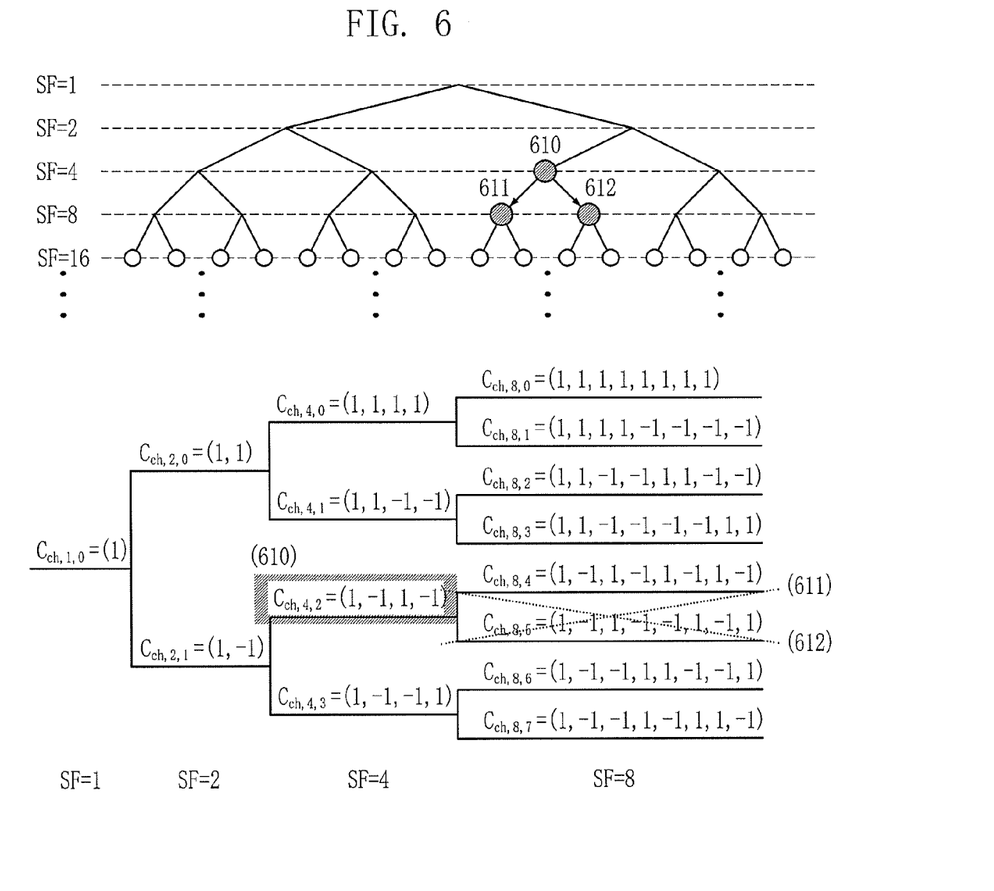
FIG. 6 is a diagram illustrating a typical OVSF tree structure.

FIG. 6 is a diagram illustrating a typical OVSF tree structure.

As shown in FIG. 6, when an OVSF code 610 having a SF of 4 is allocated, the child OVSF codes 611 and 612 cannot be allocated to the spreading apparatus and the de-spreading apparatus.

In the spreading apparatus and the de-spreading apparatus according to the present embodiment, the child OVSF code pair generators 341 and 441 generates the child OVSF code pair using the allocated OVSF code 510 without additionally allocating the SF index from a network.

For example, if the allocated OVSF code is [$C_{4,2}$]=[1, –1, 1, –1], a child OVSF pair will be [$C_{4,2}$ $C_{4,2}$]=[1, –1, 1, –1, 1, –1, 1, –1], [$C_{4,2}$ –$C_{4,2}$]=[1, –1, 1, –1, –1, 1, –1, 1], which are identical to [$C_{8,4}$] and [$C_{8,5}$].

The child OVSF code pair will be described in more detail with reference to FIG. 7.

Figure 7:
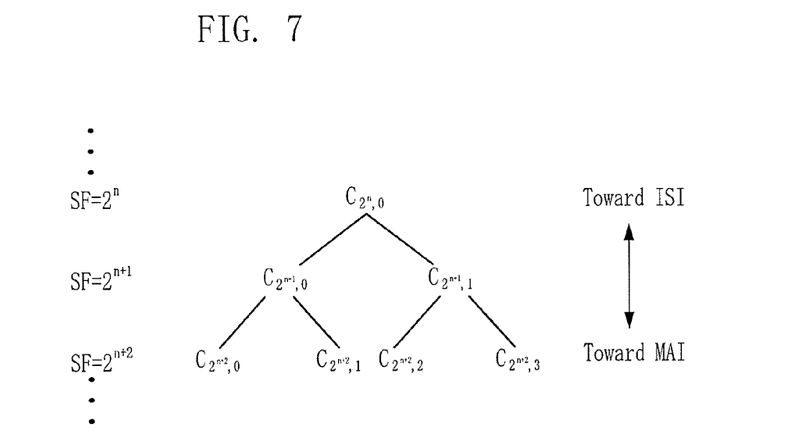
FIG. 7 is a diagram illustrating a child OVSF code pair in accordance with an embodiment of the present invention.

FIG. 7 shows a child OVSF code pair.

As shown in FIG. 7, a child OVSF code pair [$C_2^{n+1}{}_{,0}$, $C_2^{n+1}{}_{,1}$] is generated using the OVSF code $C_2^{n}{}_{,0}$. Herein, a plurality of child OVSF code pairs can be generated through generating a child OVSF code pair [$C_2^{n+2}{}_{,0}$, $C_2^{n+2}{}_{,1}$] using $C_2^{n+2}{}_{,0}$ and generating a child OVSF code pair [$C_2^{n+2}{}_{,2}$, $C_2^{n+2}{}_{,3}$] using $C_2^{n+2}{}_{,1}$.

Such an allocation of the child OVSF code pair can sustain the same transmission rate and reduce the influence of ISI. If a parent code has a large probability to be influenced by ISI, the child code also has a large probability to be influenced by MAI. The base station, however, can control it through the power control operation.

For example, when four data bits of {b0, b1, b2, b3} are spread at I-channel, the OVSF code generating module 501 generates an OVSF code $C_2^{n+1}{}_{,0}$ using a spreading factor (SF) index allocated from a network. Then, the child OVSF code pair generator 502 generates a child OVSF code pair [$C_2^{n+1}{}_{,0}$, $C_2^{n+1}{}_{,1}$] using the single OVSF code $C_2^{n+1}{}_{,0}$ generated from the OVSF code generating module 501, and sequentially transmits four data bits of [$C_2^{n+2}{}_{,0}*b_0+C_2^{n+2}{}_{,1}*b_1$] and [$C_2^{n+2}{}_{,0}*b_2+C_2^{n+2}{}_{,1}*b_3$].

Figure 4:
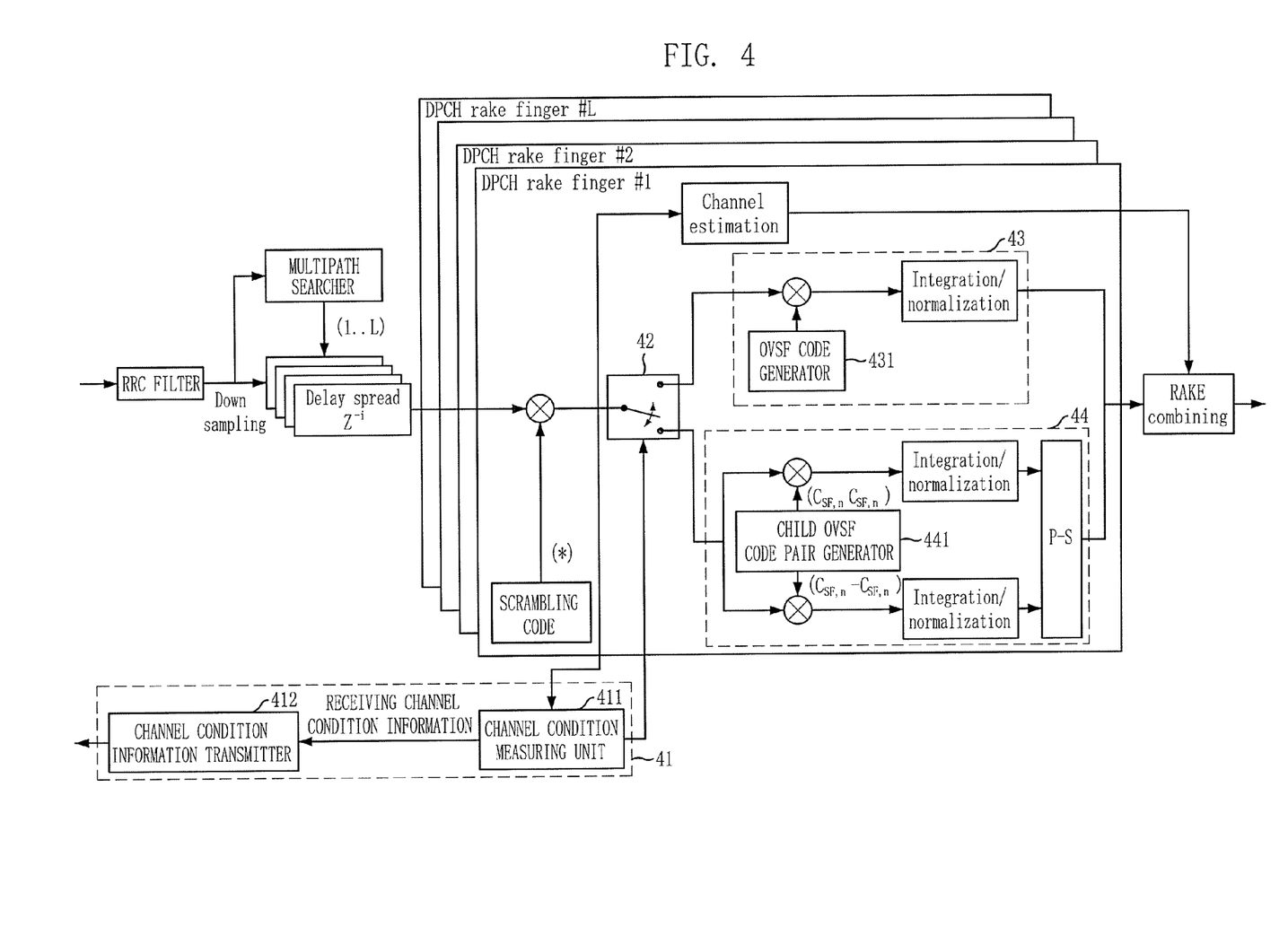
FIG. 4 is a block diagram illustrating a de-spreading apparatus using a pair of child OVSF codes in accordance with an embodiment of the present invention.

FIG. 4 is a block diagram illustrating a de-spreading apparatus using a pair of child OVSF codes in accordance with an embodiment of the present invention.

As shown in FIG. 4, the de-spreading apparatus according to the present embodiment includes a channel condition information providing unit 41 for measuring a channel condition information and providing the measured channel condition information to the switch controller 42 and the spreading apparatus, the switch controller 42 for transferring data received from the spreading apparatus to a first de-spreader 43 or a second de-spreader 44 according to the channel condition information received from the channel condition information provider 41, a first de-spreader 43 for de-spreading data received from the switch controller 42 using a signal OVSF code, and a second de-spreader 44 for de-spreading data received from the switch controller 42 using a child OVSF code pair.

The first de-spreader 43 includes an OVSF code generator 431 for generating a signal OVSF code using a SF index allocated from a network.

The second spreader 44 includes a child OVSF code pair generator 441. The child OVSF code pair generator 441 has the same structure and function of the child OVSF code pair generator 341 of the spreading apparatus.

The channel condition information provider 41 includes a channel condition measuring unit 411 for detecting the channel condition information of a downlink channel, a receiving channel, calculating a channel condition metric from the detected channel condition information, and transferring the channel condition information including the channel condition metric to a channel condition information transmitter 412, and a channel condition information transmitter 412 for receiving the channel condition information including the channel condition metric from the channel condition measuring unit 411 and transmitting the channel condition information through in-band or out-band.

That is, the channel condition measuring unit 411 transmits channel condition metric that instructs a base station, the spreading apparatus, to spread data using a child OVSF code pair if the channel condition metric value is smaller than a predetermined threshold value $\beta$ and if a SF is smaller than $\gamma$.

On the contrary, the channel condition measuring unit 411 transmits channel condition metric that instructs a base station, the spreading apparatus, to spread data using a single OVSF code if the channel condition metric is larger than the predetermined threshold value $\beta$.

Hereinafter, the channel condition metric will be described in more detail.

The channel condition metric can be calculated using Eq. 1.

$$\text{Channel\_condition\_metric}(l, k, n) = E\left[\frac{Re[P_r^l[k+n]P_r^l[k]^*]}{P_r^l[k]P_r^l[k]^*}\right] \quad \text{Eq. 1}$$

$$= E\left[\frac{\alpha_l(k+n)\alpha_l(k)\cos(\phi_l(k+n) - \phi_l(k))}{\alpha_l(k)^2}\right]$$

$$= E\left[\frac{\alpha_l(k+n)}{\alpha_l(k)}\cos(\phi_l(k+n) - \phi_l(k))\right]$$

Hereinafter, the operation of the channel condition measuring unit 411 will be described.

In general, the decrement of the spreading gain caused by high transmission rate increases the probability to be influenced by ISI in a view of multipath diversity, and the short coherence time caused by the mobility of a terminal degrades a reception rate.

The variation of coherence time due to the mobility of the terminal can be simply calculated through the inter-symbol correlation of a base station's CPICH symbol. The terminal receives signal coherently using a CPICH pilot channel of the base station.

Figure 8:
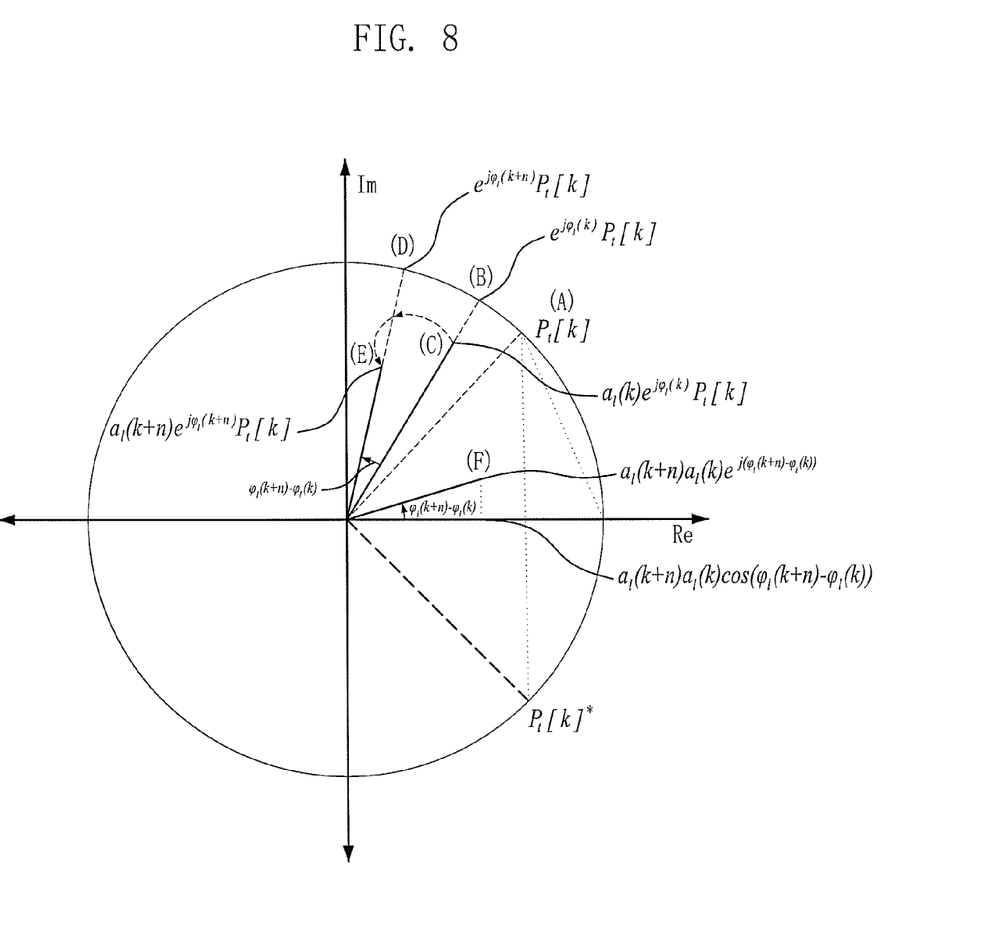
FIG. 8 is a diagram illustrating coherence time varying according to mobility, which is used in an embodiment of the present invention.

FIG. 8 is a diagram illustrating coherence time varying according to the mobility, which is used in an embodiment of the present invention.

As shown in FIG. 8, when a base station transmits a $k^{th}$ pilot symbol A ($P_t[k]$), for example $$\frac{1}{\sqrt{2}}(1+j),$$

a receiver receives a $k^{th}$ CPICH pilot symbol ($P_r^l[k]$) at the $l^{th}$ finger, which has a phase and amplitude distorted by fading channel.

That is, the phase of the pilot symbol A is distorted and attenuated like as $e^{j\Phi_l(k)}, P_t[k](B)$. As a result, the receiver receives $P_r^l[k]$ equivalent to $P_r^l[k]=\alpha_l(k)e^{j\Phi_l(k)}P_t[k]$.

If it assumes that a $(k+n)^{th}$ receiving CPICH symbol (B) at a $l^{th}$ finger is $P_r^l[k+n]=\alpha_l(k+n)e^{j\Phi_l(k+n)}P_t[k]$ where $P_t[k+n]=P_t[k]$, the real value (F) of an inter symbol relation, which is a coherence time measuring metric, is $Re[P_r^l[k+n]P_r^l[k]^*]= \alpha_l(k+n)\alpha_l(k)\cos(\phi_l(k+n)-\phi_l(k))$.

The channel condition measuring unit 411 uses the inter symbol correlation of the CPICH symbol and detects the channel condition in consideration of a channel condition metric and a transmission rate. Then, the channel condition measuring unit 411 transmits the receiving channel condition metric.

In Eq. 1, E[x] denotes an expectation value of x.

Eq. 1 takes a $k^{th}$ CPICH pilot symbol at a $l^{th}$ finger and a real value of a correlation value of a $(k+n)^{th}$ pilot symbol, and expresses an expectation ratio with a correlation value of the $k^{th}$ CPICH pilot symbol. That is, Eq. 1 calculates metrics for the variation rate of a coherence time using the correlation between a $k^{th}$ symbol and a $(k+n)^{th}$ symbol.

Figure 9:
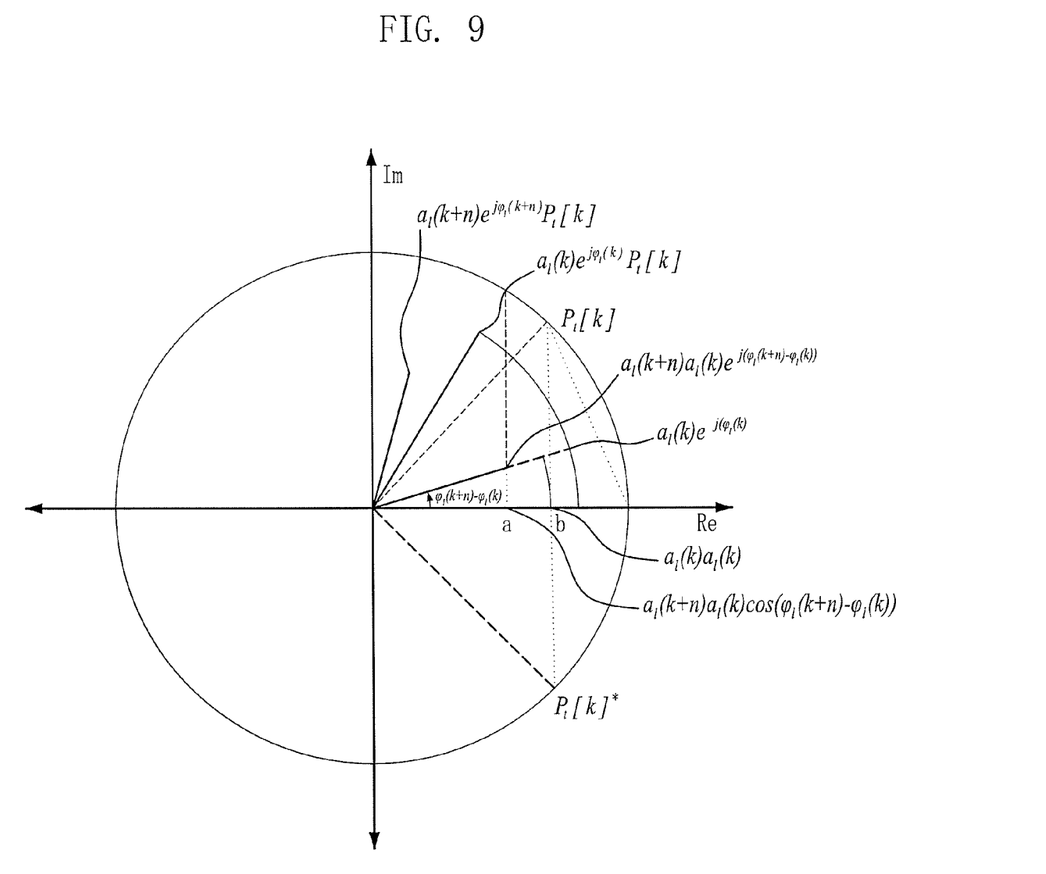
FIG. 9 is a diagram illustrating calculating of metrics of coherence time variation rate in accordance with an embodiment of the present invention.

FIG. 9 is a diagram illustrating the metrics of coherence time variation rate in accordance with an embodiment of the present invention.

As shown in FIG. 9, the channel condition metric denotes the expectation value of a/b. If the expectation value is larger than a threshold value $\beta$, the single OVSF code is used to spread or de-spread the data. On the contrary, if the expectation value is smaller than the threshold value $\beta$, the child OVSF code pair is used to spread and de-spread the data.

Herein, n value is assigned in consideration of coherence time variation caused by the mobility of a terminal as shown in Table 1. For example, the coherence time of a terminal traveling at 100 Km/hour is about 2134 us. It means that 32 CPICH symbols are coherent for the corresponding time.

In other words, significant drop is generated at Channel_condition_metric(l, k, 32), and a receiving channel condition can be detected using the correlation value of $k^{th}$ pilot signal and $(k+n)^{th}$ pilot signal at the $l^{th}$ finger. That is, the coherence time variation is checked in consideration of the mobility of the terminal by setting up N to be appropriately small and frequently detecting channel variation.

TABLE 1

| Mobile speed (km/h) | Doppler frequency (Hz) for downlink | Coherence time (us) | CPICH symbols |
| --- | --- | --- | --- |
| 5 | 9.9 | 4269 | 641 |
| 30 | 59.4 | 7115 | 106 |
| 50 | 99.1 | 4269 | 64 |
| 100 | 198.1 | 2134 | 32 |
| 150 | 297.2 | 1423 | 21 |
| 200 | 396.3 | 1067 | 16 |
| 250 | 495.4 | 853 | 12 |

TABLE 1-continued

| Mobile speed (km/h) | Doppler frequency (Hz) for downlink | Coherence time (us) | CPICH symbols |
|---|---|---|---|
| 300 | 594.4 | 711 | 10 |
| 350 | 693.6 | 609 | 9 |
| 400 | 792.6 | 533 | 8 |
| 450 | 891.7 | 474 | 7 |
| 500 | 990.7 | 426 | 6 |

Since Eq. 1 provides metric used for detecting a time when the multipath diversity gain decreases due to ISI influence at a SF with a low transmission rate, it is preferable to perform a proper calibration operation for mapping the transmission rate considered multipath diversity gain to 'channel_condition_metric' values according to the coherence time variation n caused by the terminal mobility.

Furthermore, it is preferable to calculate the 'channel_condition_metric' using the $l^{th}$ finger of the strongest signal. But, the 'channel_condition_metric' of the second strongest finger may be considered as well.

Figure 10:
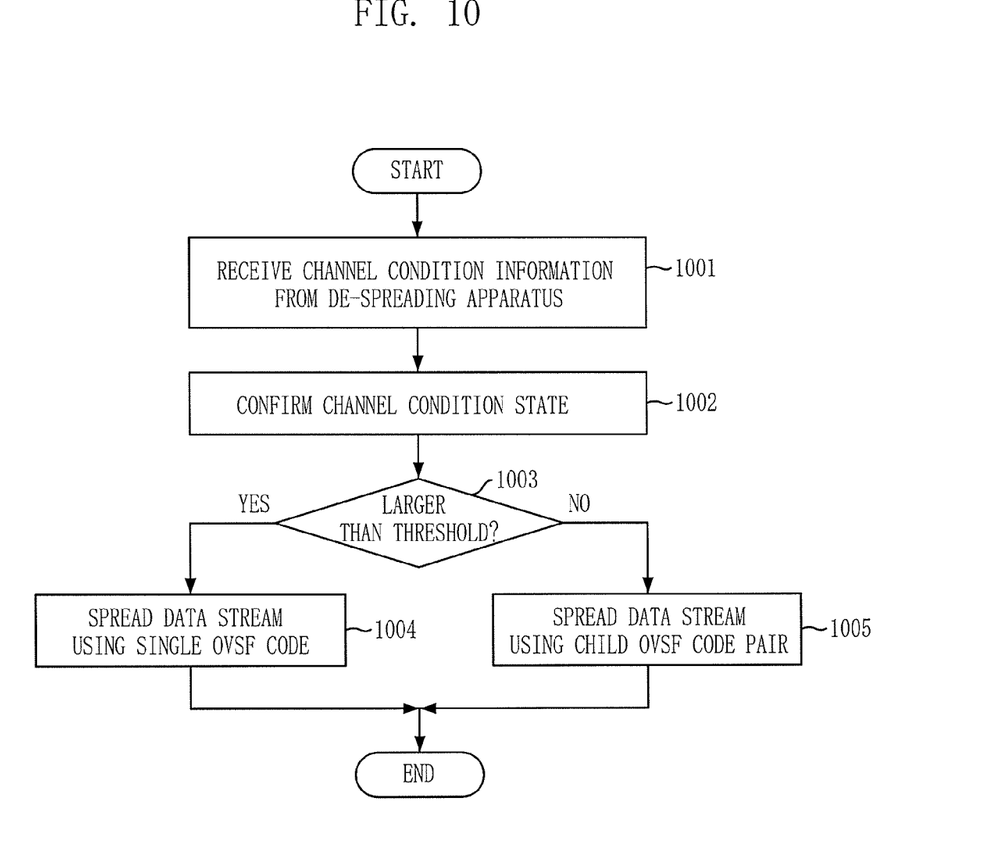
FIG. 10 is a flowchart illustrating a method of spreading data using a pair of child OVSF codes in accordance with an embodiment of the present invention.

FIG. 10 is a flowchart illustrating a method of spreading data using a pair of child OVSF codes in accordance with an embodiment of the present invention.

At first, channel condition information is received from a de-spreading apparatus at step S1001.

Then, the received channel condition information including channel condition metric is analyzed at step S1002.

Afterward, it determines whether the channel condition metric is larger than a threshold value or not at step S1003.

If the channel condition metric is larger than the threshold value β, the data is spread using a single OVSF code at step S1004.

If the channel condition metric is smaller than the threshold value β, the data is spread using a child OVSF code pair at step S1005. Herein, it determines whether the SF is smaller than a predetermined threshold γ or not. If the SF is smaller than the threshold γ, the data may be spread after generating a child OVSF code pair.

Figure 11:
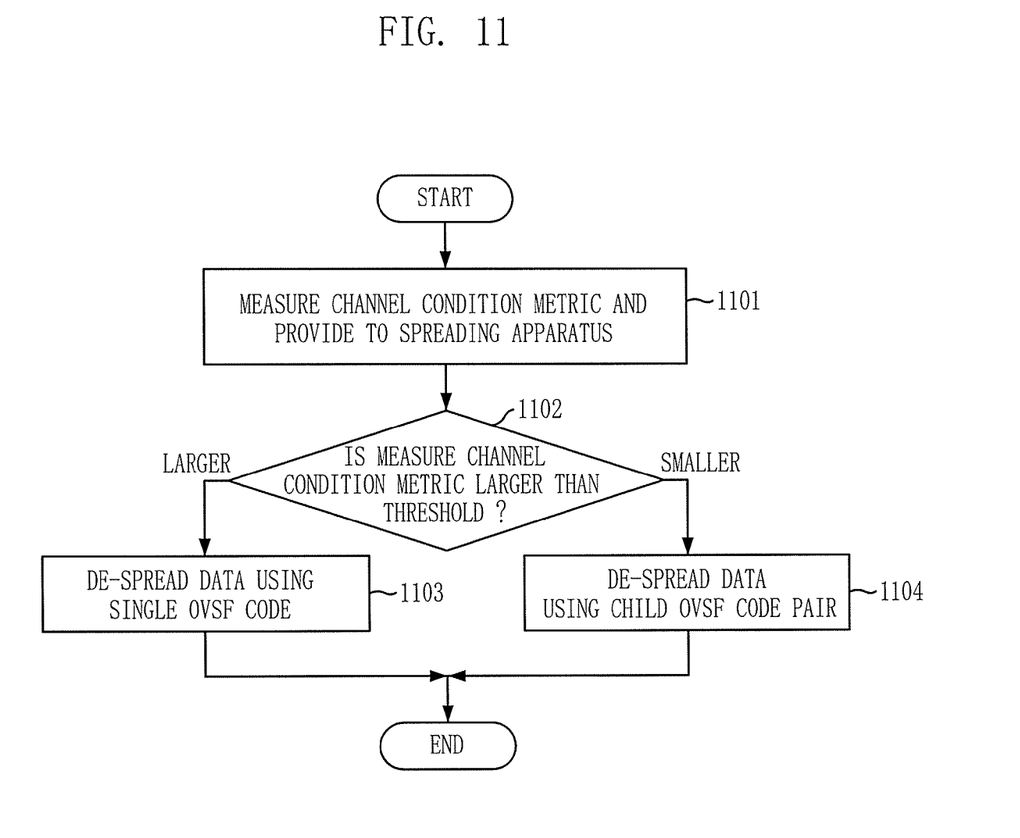
FIG. 11 is a flowchart illustrating a method of de-spreading data using a pair of child OVSF codes in accordance with an embodiment of the present invention.

FIG. 11 is a flowchart illustrating a method of de-spreading data using a pair of child OVSF codes in accordance with an embodiment of the present invention.

At first, the channel condition metric is measured and provided to the spreading apparatus at step S1101.

Then, it determines whether the measured channel condition metric is larger than a predetermined threshold or not at step s1102.

If the measured channel condition metric is larger than the predetermined threshold at step S1102, the data is de-spread using a single OVSF code at step S1103.

If the measured channel condition metric is smaller than the predetermined threshold at step S1102, the data is de-spread using a child OVSF code pair at step S1104.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

While the present invention has been described with respect to certain preferred embodiments, it will be apparent to those skilled in the art that various changes and modifications may be made without departing from the scope of the invention as defined in the following claims.

As described above, the spreading and de-spreading apparatus and method according to the certain embodiment of the present invention spreads or de-spreads data selectively using a single orthogonal variable spreading factor (OVSF) code or a child OVSF code pair according to a channel condition in CDMA and WCDMA including a RAKE structure that improves a signal to noise ratio using multipath diversity.

Therefore, the spreading and de-spreading apparatus and method in accordance with the certain embodiment of the present invention can reduce the influence of inter-symbol interference (ISI) that is caused by the mobility.

The spreading and de-spreading apparatus and method according to the certain embodiment of the present invention extends the symbol period by spreading and de-spreading the data using the child OVSF code pair. Therefore, the influence of ISI can be reduced.

The spreading and de-spreading apparatus and method according to the certain embodiment of the present invention can improve the multipath diversity gain by spreading and de-spreading the child OVSF code pair, thereby saving the wireless resources of a base station.

The spreading and de-spreading apparatus and method according to the certain embodiment of the present invention can reduce the influence of interference with varying the transmission rate, can be used for both of the uplink and the downlink, and can make a terminal to use low power by spreading and de-spreading the data using the child OVSF code pair.

What is claimed is:

1. A spreading apparatus using a child orthogonal variable spreading factor (OVSF) code pair, comprising:

a channel condition information receiving means for receiving and analyzing channel condition information including a channel condition metric wherein the channel condition metric is analyzed using equation:

$$\text{Channel\_condition\_metric}(l, k, n) = E\left[\frac{Re[P_r^l[k+n]P_r^l[k]^*]}{P_r^l[k]P_r^l[k]^*}\right],$$

wherein $P_r^l[k]$ denotes a $k^{th}$ receiving CPICH pilot symbol at an $l^{th}$ finger, $P_r^l[k]=\alpha_l(k)e^{j\Phi_l(k)}P_l[k]$ denotes $P_r^l[k]$ with phase distortion and attenuation, and $P_l[k]$ denotes a $k^{th}$ pilot symbol, $P_r^l[k+n]=\alpha_l(k+n)e^{j\Phi_l(k+n)}P_l[k]$ denotes a $(k+n)^{th}$ received CPICH symbol at a $l^{th}$ finger, and $Re[P_r^l[k+n]P_r^l[k]^*]=\alpha_l(k+n)\alpha_l(k)\cos(\phi_l(k+n))-(k))$ denotes a real value of an inter symbol correlation that is a coherence time measuring metric, $P_r^l[k]P_r^l[k]^*=\alpha_l(k)^2$, and $E[x]$ denotes an expectation value of x;

a switch controlling means for receiving the channel condition metric from the channel condition information receiving means and transferring a data stream according to the received channel condition information;

a first spreading means for receiving the data stream from the switch controlling means, and spreading the data stream using a single OVSF code; and a second spreading means for receiving the data stream from the switching controlling means, and spreading the data stream using a child OVSF code pair.

2. The spreading apparatus as recited in claim 1, wherein the second spreading means includes:

an OVSF code generating means for generating a single OVSF code using a spreading factor (SF) index allocated from a network; and a child OVSF code pair generating means for generating a child OVSF code pair using the generated OVSF code from the OVSF code generating means.

3. The spreading means as recited in claim 2, wherein the switch controlling means transfers the data stream to the first spreading means if the channel condition metric is larger than a threshold, and the switch controlling means transfers the data stream to the second spreading means if the channel condition metric is smaller than the threshold.

4. A spreading method using a child orthogonal variable spreading factor (OVSF) code pair, comprising:

receiving channel condition information including channel condition metric from a de-spreading apparatus;

analyzing the received channel condition information including the channel condition metric using equation:

$$\text{Channel\_condition\_metric}(l, k, n) = E\left[\frac{Re[P_r^l[k+n]P_r^l[k]^*]}{P_r^l[k]P_r^l[k]^*}\right],$$

wherein $P_r^l[k]$ denotes a $k^{th}$ receiving CPICH pilot symbol at an $l^{th}$ finger, $P_r^l[k]=\alpha_l(k)e^{j\phi_l(k)}P_t[k]$ denotes $P_r^l[k]$ with phase distortion and attenuation, and $P_t[k]$ denotes a $k^{th}$ pilot symbol, $P_r^l[k+n]=\alpha_l(k+n)e^{j\phi_l(k+n)}P_t[k]$ denotes a $(k+n)^{th}$ received CPICH symbol at a $l^{th}$ finger, and $Re[P_r^l[k+n]P_r^l[k]^*]=\alpha_l(k+n)\alpha_l(k)\cos(\phi_l(k+n))-\phi_l(k))$ denotes a real value of an inter symbol correlation that is a coherence time measuring metric, $P_r^l[k]P_r^l[k]^*=\alpha_l(k)^2$, and $E[x]$ denotes an expectation value of x;

spreading a data stream using a single OVSF code if the channel condition metric is larger than a threshold as the analyzing result; and spreading the data stream after generating a child OVSF code pair if the channel condition metric is smaller than a threshold as the analyzing result.

* * * * *